Aug. 6, 1929.                    E. T. TROUT                    1,723,587
                             HEADER OR BOLL PULLER
                          Filed April 30, 1927        2 Sheets-Sheet 1
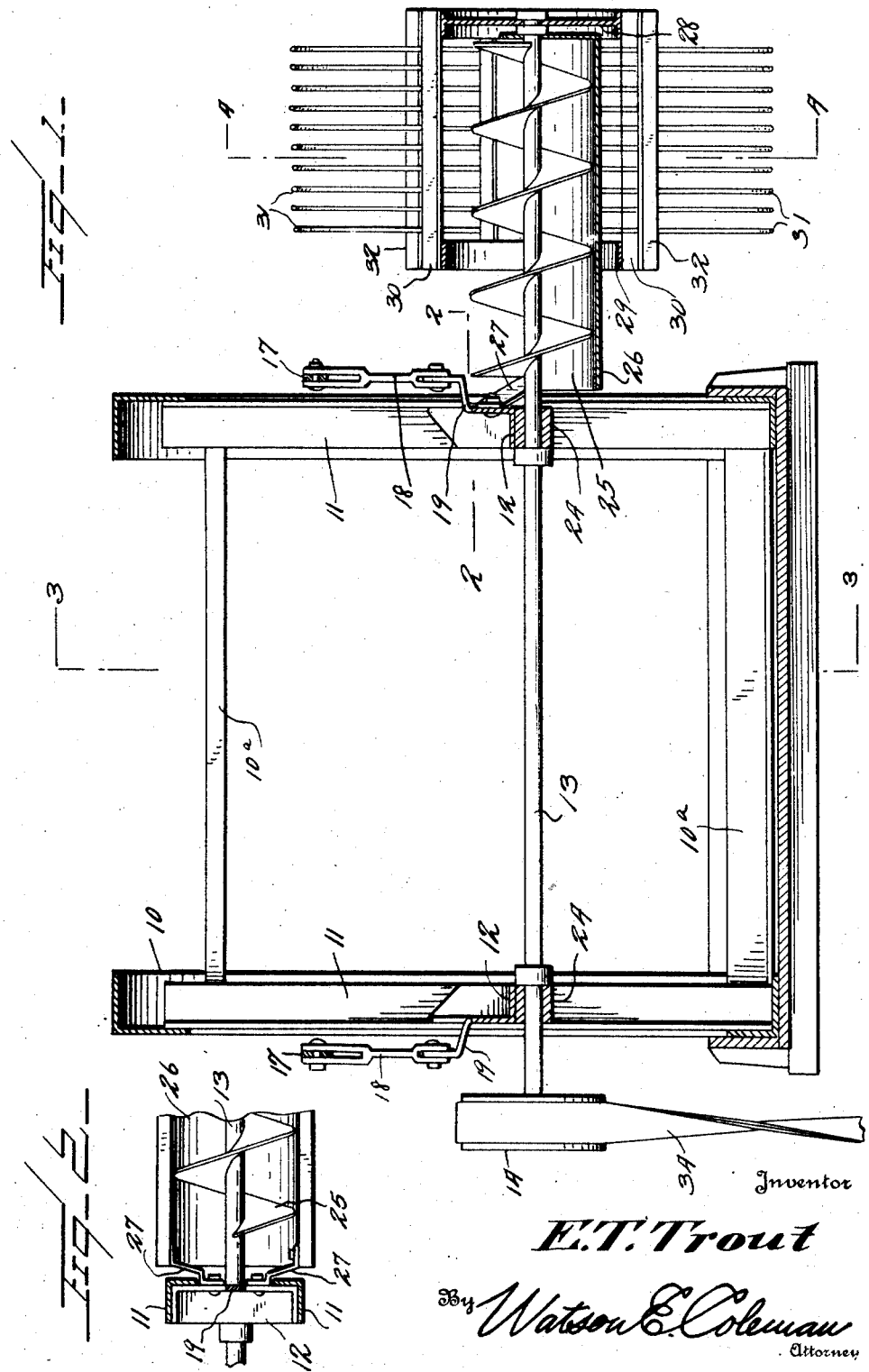
Inventor
E. T. Trout
By Watson E. Coleman
Attorney Aug. 6, 1929.　　　E. T. TROUT　　　1,723,587
HEADER OR BOLL PULLER
Filed April 30, 1927　　2 Sheets-Sheet 2
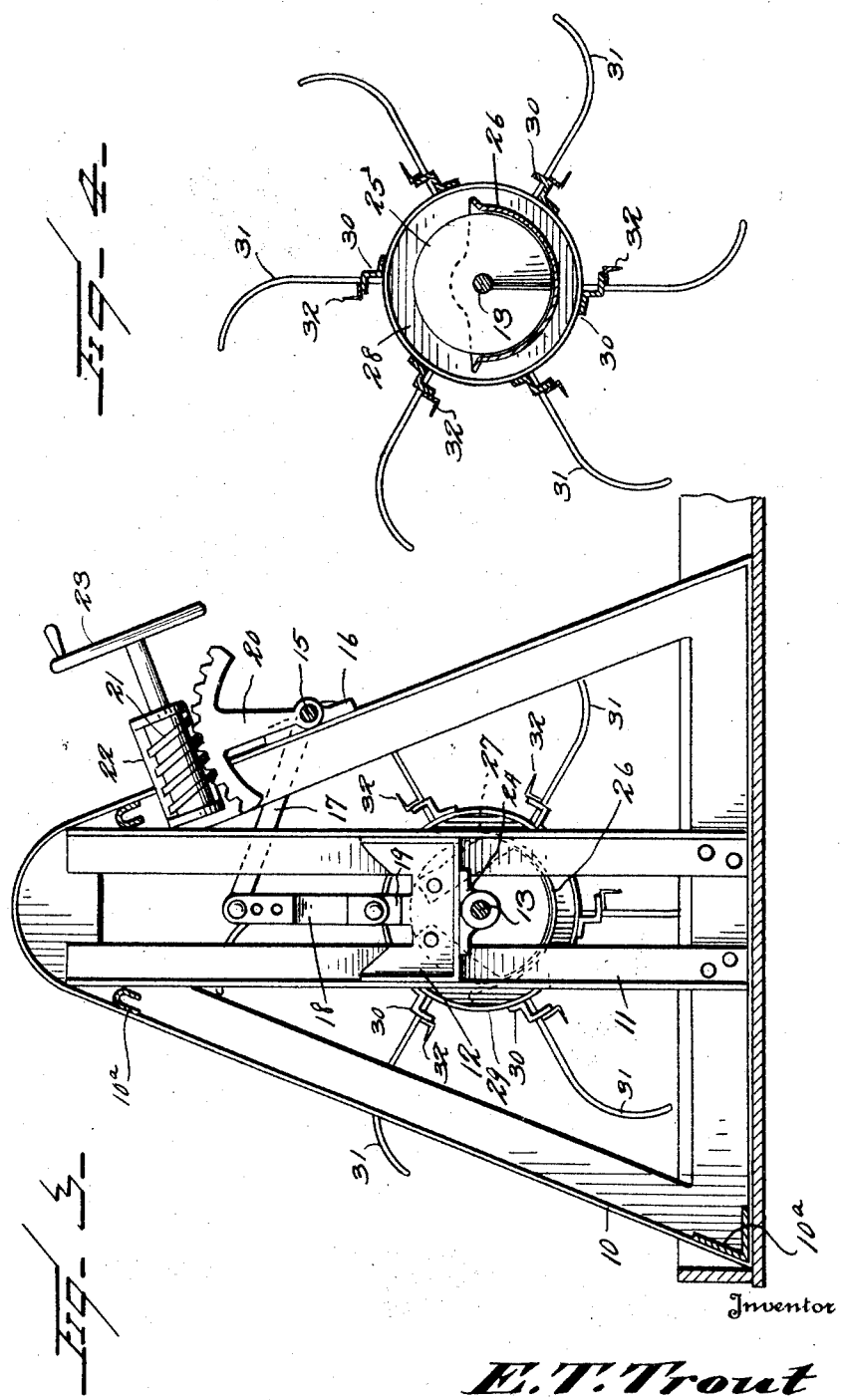

Patented Aug. 6, 1929.

1,723,587

UNITED STATES PATENT OFFICE.

ED T. TROUT, OF CHILLICOTHE, TEXAS.

HEADER OR BOLL PULLER.

Application filed April 30, 1927. Serial No. 187,937.

This invention relates to devices for heading crops such as maize, kaffir corn, and other head feeds or pulling the bolls from cotton, and the general object is to provide a mechanism of this character which may be mounted upon a low wagon and which as it passes through the fields will pull off the heads from the growing crops and discharge these heads into a wagon, or pull off the bolls of cotton in the same manner.

A further object is to provide a construction of this character which includes a puller or header and which is mounted for vertical adjustment at the will of the operator so that it may be raised and lowered to suit conditions where the stalks are high or where they are low.

A further object is to provide a construction of this character including a revolving header provided with a plurality of series of curved pulling fingers or teeth and a knife coacting with each set of fingers or teeth which will act to cut off the head which has been pulled off by the fingers and in this connection provide a conveyor into which the heads are discharged which will discharge the heads into a wagon.

My invention is illustrated in the accompanying drawings, wherein:—

Figure 1 is a longitudinal sectional view of the device constructed in accordance with my invention;

Figure 2 is a fragmentary detailed section on the line 2—2 of Figure 1;

Figure 3 is a transverse section on the line 3—3 of Figure 1;

Figure 4 is a detailed sectional view on the line 4—4 of Figure 1.

Referring to these drawings, it will be seen that my mechanism comprises the oppositely disposed upright frames 10 which may be conveniently made of angle iron, though I do not wish to limit myself thereto. Each of these frames includes the vertically disposed angle iron guides 11. Operating in these guides are slides 12 which are angular in form so as to fit the angle irons 11 and these slides carry the longitudinally extending shaft 13 upon one end of which the belt wheel 14 is mounted. The slides 12 are raised and lowered in the guides 11 by means of a transversely extending rock shaft 15 mounted in bearings 16 on the members 10, this rock shaft having inwardly projecting arms 17. Pivoted to the ends of these arms are the links 18 which in turn are pivoted to ears 19 extending from the slides 12. The links 18 are preferably formed with a plurality of apertures into which the pivot bolts for the arms 17 and for the ears 19 may be disposed so that the links are thus adjustable. The rock shaft 15 is operated by means of a sector 20 mounted upon the rock shaft and a worm 21 mounted in brackets 22 extending from the frame, the worm being provided with the hand wheel 23. It will thus be seen that the hand wheel may be turned in one or the other direction to raise or lower the driving shaft 13 and that because a worm is used for this purpose, the shaft 13 will be held firmly in either its raised or its lowered position.

The shaft 13 passes through bearings 24 on the slides 12 and this shaft projects out any desired distance to one side of the machine. The shaft carries upon it the screw 25 and mounted upon the adjacent slide 12 is a trough 26, one end of this trough being formed with ears 27 which are attached to the slide. Carried upon the extremity of the shaft 13 is the puller. This consists of an outer head 28 and an annulus 29 spaced from the head. This annulus and head are connected by longitudinally extending bars 30 which project outward from the annulus and head, the annulus and head being exterior to the trough 26. The bars 30 are in the form of flanges projecting outward and rearward from the periphery of the head and the periphery of the annulus 29 and mounted in these angle iron bars are the fingers 31 which extend radially outward and then rearward in a curve. There are a plurality of sets of these fingers 31, six of these sets being shown. Attached to or forming part of transverse bars 30 are the knives 32 which extend parallel to the bases of the fingers 31 and are disposed over the bases of the fingers.

In the operation of this mechanism, the frames 10 which are connected by means of one or more cross pieces 10ª are mounted within a wagon body, preferably a relatively low wagon body, and bolted inside the front end of the wagon bed, with the pulling drum on the right of the machine and the pulley 14 on the left. This pulley may be driven in any suitable manner, but in actual practice, the pulley may be driven by means of a cross belt 34 which is engaged with a band wheel connected to the wagon wheel. Any suitable means for operating the shaft 13 from the traction wheels of the wagon may be used and, of course, where I have heretofore referred to wagon, it is obvious that this device may also be mounted upon a motor driven vehicle or tractor.

As the wagon moves across the field, the drum with the pulling fingers will be caused to rotate in a counterclock wise direction and thus the fingers pick up the maize stalks, for instance, or the cotton stalks, the moving wagon causing the stalk to slip through the fingers until the head on the stalk is caught. At this time the head has been brought to the bases of the fingers and then the knife operates to cut off the stalk. The head then drops into the trough 26 and the heads so cut off are conveyed to the inner end of the trough and discharged therefrom by means of the screw conveyor 25.

This mechanism is adapted for pulling and cutting off all crops which have headed stalks and for pulling and cutting off cotton bolls, thus doing away with the necessity of picking cotton bolls by hand. Obviously the header composed of the revolving drum with its fingers and knives may be of any desired length, and may contain any number of sets of fingers as deemed necessary. Obviously, also, I do not wish to be limited to the form of my mechanism as modifications might be made therein without departing from the spirit of the invention as defined in the appended claims.

I claim:—

1. A header and puller including in its organization a trough, a conveyor mounted in the trough and discharging at one end thereof, and a heading and pulling drum rotatably mounted and disposed exteriorly to and rotatable around one end of the trough, and discharging therein, the drum carrying a plurality of sets of outwardly projecting forwardly curved fingers and a plurality of knives, each knife being disposed behind and at the base of a set of fingers and extending at right angles to the direction of rotation of the fingers.

2. A header and puller including in its organization a supporting frame, a trough mounted thereon, a shaft extending into the trough and carrying a screw conveyor and a pulling and cutting drum comprising a head mounted upon the outer end of the shaft outward of the end of the trough, an annulus surrounding the trough and disposed inward of said head, longitudinally extending members connecting the annulus and head, a plurality of outward and forwardly curved fingers extending from said members, and cutting knives disposed behind each set of fingers at the base thereof and extending transversely of and at right angles to the plane of rotation of said fingers.

3. A header and puller including in its organization a supporting frame, slides mounted for vertical movement in the supporting frame, a shaft mounted in the slides, manually operable means for raising or lowering the slides to thereby raise or lower the shaft, the shaft at one end projecting beyond the frame and carrying a screw conveyor a trough mounted upon the adjacent slide and within which the screw conveyor operates, and a hollow open drum mounted upon the shaft and disposed exteriorly to the trough and including a plurality of sets of outwardly and forwardly curved fingers, and cutting knives one for each set of fingers and disposed behind and at the base thereof.

4. A header and a puller including in its organization oppositely disposed frames, each frame having vertical guide members, vertically movable slides mounted in said guide members, a shaft carried by said slides, the shaft projecting at one end beyond said frame and the shaft carrying means whereby it may be rotated, means for raising or lowering the slides including a rock shaft having inwardly projecting arms, links connecting the arms to the slides, a sector gear mounted upon the shaft, a worm engaging the sector gear, a trough mounted upon one of said slides concentric to the projecting end of the shaft, a screw conveyor mounted on the shaft and operating within the trough and discharging the contents of the trough at the inner end thereof, and surrounding the trough and having curved fingers mounted thereon and comprising a head attached to the outer end of the shaft beyond the trough, an annulus surrounding the trough, transversely extending members connecting the annulus and head, a plurality of sets of outwardly and forwardly curved fingers mounted upon the transversely extending members and knives, one for each set of fingers mounted upon the members at the bases of said fingers.

5. The combination with a wagon, of a frame adapted to be mounted upon the wagon bed, a shaft carried by the frame and having means whereby it may be driven from traction wheels of the wagon, manually operable means for raising and lowering the shaft upon said frame, a trough disposed concentric to the shaft, and vertically movable therewith, a screw conveyor mounted upon the shaft and operating within the trough and discharging at the inner end of the trough, a rotatable drum of open work construction mounted upon the end of the shaft and extending concentric to the trough and having a plurality of sets of outwardly and forwardly curved fingers, and a knife disposed at the base of and behind each set of fingers.

In testimony whereof I hereunto affix my signature.

ED T. TROUT.